United States Patent [19]
Kausch et al.

[11] Patent Number: 5,674,567
[45] Date of Patent: Oct. 7, 1997

[54] LOW VOC, PRIMERLESS, POLYURETHANE COMPOSITIONS

[75] Inventors: Charles M. Kausch, Akron; Earl G. Melby, Uniontown; Satish C. Sharma, Stow, all of Ohio

[73] Assignee: GenCorp Inc., Fairlawn, Ohio

[21] Appl. No.: 556,778

[22] Filed: Nov. 2, 1995

Related U.S. Application Data

[62] Division of Ser. No. 233,870, Apr. 26, 1994, Pat. No. 5,488,092.

[51] Int. Cl.$^6$ .................................................... B05D 3/02
[52] U.S. Cl. ................... 427/385.5; 427/387; 427/393.5; 427/334; 427/340; 428/423.1; 428/122; 264/50; 528/60; 528/66; 528/70; 524/267
[58] Field of Search ................... 427/372.2, 334, 427/340, 344, 385.5, 387, 393.5; 528/60, 66, 70; 524/267; 428/423.1, 122; 264/50

[56] References Cited

U.S. PATENT DOCUMENTS

| | | |
|---|---|---|
| 4,101,530 | 7/1978 | Burkhardt et al. . |
| 4,267,206 | 5/1981 | Johnson . |
| 4,606,974 | 8/1986 | Thoma et al. . |
| 4,631,206 | 12/1986 | Mabuchi et al. . |
| 4,856,502 | 8/1989 | Ersfeld et al. . |
| 4,898,919 | 2/1990 | Ueda et al. . |
| 4,987,204 | 1/1991 | Murachi . |
| 5,115,007 | 5/1992 | Chihara et al. . |
| 5,221,707 | 6/1993 | Chihara et al. . |

FOREIGN PATENT DOCUMENTS

| | | |
|---|---|---|
| 1225769 | 8/1987 | Canada . |
| 0 107 838 A3 | 5/1984 | European Pat. Off. . |
| 59-201838 | 4/1983 | Japan . |
| 60-24821 | 6/1985 | Japan . |
| 60-179251 | 9/1985 | Japan . |
| 60-181137 | 9/1985 | Japan . |
| 60-173011 | 9/1985 | Japan . |
| 60-179470 | 9/1985 | Japan . |
| 61-137735 | 6/1986 | Japan . |
| 61-136528 | 6/1986 | Japan . |
| 62-41215 | 2/1987 | Japan . |
| 63-130616 | 6/1988 | Japan . |
| 64-6017 | 1/1989 | Japan . |
| 2 215 337 | 9/1989 | United Kingdom . |

OTHER PUBLICATIONS

European Search Report 95302838.8, dated Aug. 8, 1995.

*Primary Examiner*—Samuel A. Acquah
*Assistant Examiner*—Duc Truong
*Attorney, Agent, or Firm*—Robert F. Rywalski; Samuel B. Laferty

[57] ABSTRACT

A primerless, one-part, heat curable, low volatile organic compound, polyurethane composition comprises a blocked polyurethane prepolymer made from a liquid hydroxyl terminated intermediate and an excess of a polyisocyanate, a curing agent, silicone and/or low friction polymer and optional fillers. Upon cure of the polyurethane composition, the silicone oil and/or low friction polymer generally imparts low friction and high abrasive resistant properties. A desired use is as a glass run channel coating.

12 Claims, No Drawings

LOW VOC, PRIMERLESS, POLYURETHANE COMPOSITIONS

CROSS-REFERENCE

This is a division of application Ser. No. 08/233,870 filed Apr. 26, 1994, of C. M. Kausch et al., for "Low VOC, Primerless, Polyurethane Compositions", now U.S. Pat. No. 5,488,092.

BACKGROUND

The present invention relates to low level volatile organic compound polyurethane compositions which can be utilized on various substrates as a cured coating having low friction and high abrasion resistance.

Heretofore, primerless, silicone containing polyurethane compositions comprising a urethane prepolymer made from hydrogenated conjugated polydienes or polyolefins were often not desirable for use as coatings on rubber substrates due to their high cost and high volatile organic compound level.

SUMMARY OF THE INVENTION

Environmentally friendly polyurethane compositions which when cured have low friction and high abrasion resistance are derived from liquid hydroxyl terminated intermediates. The intermediates are reacted with an excess of one or more polyisocyanates such as MDI to form a polyurethane prepolymer and subsequently blocked. Silicone oil and/or various low friction polymers such as powdered nylon, various fluorinated polymers, polypropylene, etc., are incorporated in the composition along with various curing agents which upon heating react and crosslink the urethane prepolymer. The polyurethane compositions are useful as coatings on rubber substrates, for example EPDM, as in the form of glass run channels and are ecologically desired in that they have low or nil volatile organic compound (VOC) levels. Moreover, depending upon the substrate, the one-part polyurethane compositions of the present invention can be used as an adhesion promoter blended with various polyesters, polyolefins, polyethylenes, and the like.

DETAILED DESCRIPTION OF THE INVENTION

The low VOC, primerless polyurethane compositions of the present invention comprise a blocked polyurethane prepolymer derived from a liquid intermediate, a coreactive crosslinker or curing agent, silicone oil and/or low friction polymers, and, optional fillers.

It is an important aspect of the present invention that the blocked prepolymer is made from a liquid hydroxyl terminated intermediate which desirably is a polyether polyol having a number average molecular weight of from about 400 to about 10,000, desirably from about 750 to about 5,000 and preferably 1,000 to about 3,000. While the polyether can be a triol, a tetrol, a pentol, etc., diols are preferred. Suitable polyether polyols are generally made by reacting an alkylene oxide having from 2 to 10 carbon atoms, desirably from 3 to 6 carbon atoms with 4 carbon atoms such as 1,2-butylene oxide being preferred, with a strong base such as potassium hydroxide, preferably in the presence of water, glycols and the like. Although branched polyethers can be utilized, straight chain polyethers are preferred. Examples of suitable polyethers include polyoxyethylene, polyoxypropylene, branched and straight chain polyoxybutylene, branched and straight chain polyoxypentylene, and the like with n-polyoxybutylene being highly preferred. Encompassed within the definition of suitable polyethers of the present invention are those produced by the polymerization of tetrahydrofuran.

Other liquid hydroxyl terminated intermediates are the various polyester polyols typically formed by the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monoethyl ether, diethylene glycol, 2-ethylhexanediol-1,4,cyclohexanediol-1,4, 1,2,6-hexanetriol, 1,3,5-hexanetriol, 1,3-bis-(2-hydroxyethoxy) propane and the like. Examples of polycarboxylic acids include the following: phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and their corresponding acid anhydrides, and acid chlorides and acid esters such as phthalic anhydride, phthaloyl chloride and the dimethyl ester of phthalic acid. Preferred polycarboxylic acids are aliphatic and cycloaliphatic dicarboxylic acids and aromatic dicarboxylic acids containing no more than 14 carbon atoms. Polyesters from lactones (for example ε-caprolactone) and polyacetals, polycarbonates or polybutadienes containing terminal hydroxyl groups are also suitable. Any polyhydric alcohol having more than 2 hydroxyl groups or any polycarboxylic acid having more than 2 carboxylic groups used to make the polyesters should be used in only very minor amounts, e.g., less than 10 or 5 percent by weight based upon the weight of the liquid hydroxyl terminated intermediate, to prevent crosslinking and gelling.

In addition to the above intermediates, generally any hydroxyl terminated intermediate can be utilized so long as it is typically a liquid and has a relatively low viscosity so that the end composition has a suitable viscosity as set forth below.

In order to achieve an uncured polyurethane composition having a low VOC content, the equivalent ratio of the polyisocyanates to the hydroxyl terminated intermediate, (NCO/OH), is high, that is, generally from about 2 to about 8, desirably from about 3 to about 7, and preferably from about 4 to about 6. The polyisocyanates which can be utilized generally have the formula $R(NCO)_n$ where n is from about 2.0 to about 4.0 with approximately 2.0 to about 2.3 being preferred. R can be an aliphatic having from about 2 to about 20 carbon atoms with from about 6 to about 15 carbon atoms being preferred, an aromatic including an alkyl substituted aromatic having from about 6 to about 20 carbon atoms with from about 6 to about 15 carbon atoms being preferred, or combinations thereof. Aromatic polyisocyanates are generally faster reacting while aliphatic polyisocyanates generally result in better UV stability. Examples of suitable polyisocyanates include 1,6-diisocyanato hexane, 2,2,4-and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Also useful are diisocyanates prepared by capping low molecular weight, that is, less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used. Examples of still other isocyanates include 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diphenyldiisocyanate, 4,6-dimethyl-1,3-phenylenediisocyanate, 1,10-anthracenediisocyanate, 4,4'-diisocyanatodibenzyl, 3,3-dimethyl-4,4'diisocyanatodiphenylmethane, 2,6-dimethyl-4,4'diisocyanatodiphenyl and others and mixtures of the same. TDI is desirably utilized. The various diphenylmethane diisocyanates (MDI) and mixtures of MDI with polymeric MDI having an average isocyanate functionality of from about 2 to about 2.3 are preferred.

Inasmuch as it is an important aspect of the present invention that the hydroxyl terminated intermediate be a liquid, generally excluded are intermediates which are a hydroxyl terminated hydrogenated diene polymer or a polyolefin such as those set forth in U.S. Pat. Nos. 5,115,007 and 5,221,707, which are hereby fully incorporated by reference. Hydroxyl terminated hydrogenated diene polymer and hydroxyl terminated polyolefin are generically called hydroxyl terminated hydrocarbons. Desirably, these hydroxyl terminated hydrocarbon polymers to be excluded have a number average molecular weight of from about 500 to about 15,000 and have at least 1.5 hydroxyl groups per molecule that is, the polyol intermediates of the present invention generally are free of or desirably contain less than 10 percent by weight and preferably less than 5 or 2 percent by weight of such hydrogenated diene polymer or polyolefin intermediates based upon the total weight of all intermediates.

The above noted polyurethane prepolymers of the present invention are blocked with various blocking agents which desirably deblock at low temperatures such as from about 80° C. to about 220° C. and desirably from about 80° C. to about 170° C. Suitable blocking agents include ketoximes, triazoles and imidazoles, phenols, lactams, and the like. The ketoximes generally have about 3 to about 20 carbon atoms and desirably from about 3 to about 15 carbon atoms and include dimethyl-, methylethyl-, diisopropyl-, or dicyclohexylketoxime, benzophenone and the like, with methyl-ethyl ketoximine being highly preferred. The triazoles and imidazoles generally have a total of from 2 to 10 carbon atoms and include benzotriazole, tolyltriazole, phenylimidazole, and the like, with benzotriazole being preferred. The phenols are known to the art and to the literature and include phenol, nonylphenol, and the like. The lactams generally contain a total of from about 4 to 12 carbon atoms and are also well known to the art and to the literature with specific examples including epsilon-caprolactam, lauryl lactam, and the like. Other classes of deblocking agents include various cyclic ureas and various amines.

The amount of the blocking agent in the urethane prepolymer composition is generally an equivalent ratio of blocking agent/free NCO groups (i.e., free NCO groups of the prepolymer, of the free polyisocyanates, etc.) of from about 1.0 to about 1.2 and preferably from about 1.0 to about 1.1.

The blocked polyurethane prepolymers of the present invention are generally low viscosity liquids and thus abate and even eliminate the need for organic solvents which are environmentally undesirable. Solvents, when utilized in the present invention, are generally non polar and non reactive with the various urethane composition components and thus generally exclude alcohols, amines, carboxylic acids, and the like. Suitable nonpolar hydrocarbon solvents generally include aromatic compounds such as toluene, xylene, and the like, various ketones such as acetone, internal ethers such as tetrahydrofuran and diethyl ether, various amides such as dimethylformamide and N-methylpyrollidone, and various alkanes having from about 6 to about 12 carbon atoms such as hexane, heptane, and the like.

The amount of the volatile organic compounds (VOC) of the one-part urethane composition of the present invention is generally 70 or 60 percent or less, desirably 50 or 40 percent or less, and preferably 30, 20, or 10 percent or less and can even be 5 percent or less or nil, (i.e., free of) by weight based upon the total weight of the polyurethane composition, i.e., including fillers, silicone oil, low friction polymers, etc. The compounds which comprise the VOC are generally the organic solvents with the remainder being other volatile compounds in the composition such as blocking agents and the like.

VOC is generally defined as any compound which under processing conditions and the like are volatile such as the above noted solvents. Typically, processing conditions include heating the polyurethane compositions of the present invention up to about 250° C. and desirably up to about 230° C. Thus, compounds which have boiling points of generally 250° C. or less or 230° C. or less are defined as volatile compounds.

Suitable viscosities are such that either the blocked polyurethane prepolymers or the formulated coatings (i.e., the polyurethane compositions) per se are pourable, transferable, and the like generally at processing conditions. Desired viscosities as measured on a Bohlin rheometer at 70° C. to 90° C., e.g., 80° C., are generally from about 500 or 1,000 to about 20,0000 centipoise, desirably less than 10,000 centipoise and preferably less than 7,000 centipoise.

The coreactive curing agents which serve to crosslink the prepolymer are generally amine, polyol, or mercaptan type compounds which rapidly react with the free isocyanate which is generated above the deblocking temperature of the blocking agents such as temperatures above 80° C. to about 220° C. and desirably from above 80° C. to about 170° C. Suitable amine containing curing agents include those containing —NH$_2$, —NHR$^1$, etc., groups, where R$^1$ is an alkyl having from 1 to 4 carbon atoms, —OH, or —SH groups, and the like. Such crosslinking or curing agents are known to the art and to the literature. Particularly preferred curatives or crosslinking agents comprise aliphatic, primary or secondary di-, tri-, and tetra-functional amines having a boiling point above about 100° C. Examples of amine crosslinking agents include polyoxypropylene- or polyoxy(propylene/ethylene)-based primary di- and triamines sold by Texaco Chemical Company under the trademark "Jeffamine," which are herein fully incorporated by reference, such as T-403 (triamine; MW about 480), EDR- 148 (diamine; MW about 150), T-3000 (triamine: MW about 3,000), T-5000(triamine: MW about 5,000), D-230 (diamine; MW about 200), D-400 (diamine; MW about 400), or D-2000 (diamine; MW about 2,000). Other crosslinking agents include polyamido resins containing amino end groups, sold by Henkel Corporation under the trademarks "Versamid" or "Genamid," which are hereby fully incorporated by reference, such as Versamids 100, 115, 125, 140, 150, 250, or Genamids 250, 747, 2000, and the like. Still other useful amine curatives include isophoronediamine (Huels Co.), mixed trimethylenediamine (TMD; Huels Co.), N,N'-diaminoethylpiperazine, N-aminoethylpiperazine, 1,4-cyclohexanediamine, 1,6-hexanediamine, 1,4-butanediamine, diethylenetriamine, m- or p-xylylenediamine, ethylenediamine, liquid poly (dimethylsiloxane)-diamine, various aromatic di- or triamines, which are liquid, or low melting, soluble or dispersible in the coating mixture such as a ring methylated phenylenediamine (RDX-66884 sold by Interez Co.) or poly(tetramethylene oxide)-bis-(4-aminobenzoates) (Polyamine-650 and -1000 sold by Air Products), and the like.

Other useful crosslinking agents include polyols (desirably, triols or tetrols) having a number average molecular weight of from about 100 to about 8,000, which may be used either alone or in combination with diamines, and generally have a total of from 2 to about 100 carbon atoms. Polyols having primary hydroxyl groups as well as tertiary, secondary or primary amino groups in their structures, such as triethanolamine, diethanolamine or ethanolamine can also be used as can curatives having two or more sulfuryl groups or combinations of $NH_2$, OH and SH groups.

The use of catalysts with respect to the formation of the prepolymer and/or cure is optional and low amounts such as from about 0.01 to about 0.05 parts by weight based upon the total weight of all the reactants which form the polyurethane are often suitable. Suitable catalysts include various organo tin compounds such as dioctyltin dilaurate, dibutyltin dilaurate and the like as well as various tertiary amines, generally having from about 3 to about 15 carbon atoms such as triethylamine, dimethylaniline, and the like with triethylenediamine being preferred. Other catalysts also include various acetonates such as ferric acetyl acetonate.

In accordance with the present invention, various types of silicone oil can be utilized in suitable amounts, for example, up to about 40 parts by weight, desirably from about 1 to about 30 parts by weight, and preferably from about 2 to about 20 parts by weight based upon 100 total parts by weight of composition excluding the solvent. That is, by definition based upon the total weight of the so called solids content of the composition. The silicone oils which can be utilized are low molecular weight liquids or fluid silicone polymers and generally have a silicone backbone structure comprising alternate silicone and oxygen atoms with the generalized structure

where R*, independently is an alkyl group having from 1 to 4 carbon atoms and preferably is methyl, and "n" is from 2 to about 5,000. The silicone polymer can also contain minor amounts, that is, up to about 40 percent, or up to 10 percent of repeating units such as fluoroalkyl (1 to 4 carbon atoms), or phenyl, as well a substituted hydrogen, chlorine or alkoxy (1 to 4 carbon atoms) groups. Suitable silicone oils in accordance with the present invention have a viscosity from about 0.5 centistokes to about 2,500,000 centistokes and preferably from about 500 to about 1,000,000 centistokes. Preferred silicone oils include linear polydimethylsiloxanes with trimethylsiloxy terminated polysiloxanes, and derivatives thereof being most preferred.

The present invention also relates to the use of various low friction polymers which are abrasion resistant. Such polymers can be used in combination with the various silicone oils or as a partial replacement thereof, or often in lieu thereof. That is, it is an important aspect of the present invention that the low friction polymers be used in significant amounts so that they substantially or completely replace the silicone oil inasmuch as it has been unexpectedly found that abrasion resistance results are often significantly improved. The substantial or complete elimination of silicone oil is also highly desired inasmuch as the oil tends to bloom or bleed to the surface of the blocked polyurethane prepolymer compositions of the present invention. Suitable friction reducing polymers generally having suitable abrasion resistant properties include the various nylons, that is, polyamides, such as Nylon 6, Nylon 66, Nylon 610, and the like with Nylon 11 and Nylon 12 being preferred. Generally any fluorinated polymer including fluorinated block and/or graft copolymers can be utilized wherein the repeat units contains one or more fluorine atoms with specific examples including polyvinyl fluoride, polyvinylidene fluoride, copolymers of vinylidene fluoride-hexafluoropropylene, polychlorotrifluoroethylene, copolymers of chlorotrifluoroethylene and vinylidene fluoride, perfluoroacrylate polymers, and the like with polytetrafluoroethylene being highly preferred. Fluorinated ethylene propylene, perfluoroalkoxy polymers, ethylene-chlorotrifluoroethylene copolymers, ethylene-tetrafluoroethylene copolymers can also be used. Other friction reducing polymers include polyethylene, polypropylene, and the like. Blends of two or more of the above polymers are often desirable such as a mixture of polytetrafluoroethylene and polyethylene.

The above friction reducing polymers generally have a number average molecular weight of at least 2,000 and desirably at least 5,000. When the various low friction polymers are utilized as a primary friction reducing compound, the amount of silicone oil is generally very low, generally less than 5 parts by weight, desirably less than 3, 2, or 1 parts by weight and preferably nil (that is free thereof) parts by weight based upon the total weight of the polyurethane prepolymer composition less any solvent. The amount of the low friction polymers is generally up to or from about 2 to about 50, desirably from about 3 to about 30, and preferably from about 4 to about 20 parts by weight based upon 100 total parts by weight of the solids composition, that is, the total weight of the prepolymer composition excluding any solvents.

In accordance with the present invention, good abrasion resistant values of the polyurethane composition are obtained such as generally at least 150 cycles, desirably at least 200 cycles, and preferably at least 250 cycles per micrometer as measured by the crockmeter abrasion resistance test as set forth in U.S. Pat. Nos. 5,115,007 and 5,221,707. Unexpectedly, when the low friction polymers of the present invention are utilized substantially by themselves as additives, abrasion resistant values of at least 300 or 500, desirably at least 1,000 and preferably at least 2,000 are obtained.

The blocked polyurethane prepolymer compositions of the present invention can optionally contain various filler additives generally in the form of powders or micropowders. For example, fumed silica is often utilized to keep the silicone oil from bleeding or migrating out of the composition. Other fillers include talc, calcium carbonate, kaolin clay, carbon black, graphite, molybdenum disulfide, and the like, as well as various pigments, for example, titanium dioxide and iron oxide, various antioxidants, various UV inhibitors, and the like. The amount of the various fillers varies depending upon the desired end result and generally is up to 40 parts by weight and desirably up to 5 or 15 parts by weight per 100 parts by weight of the composition excluding the VOC's.

The primerless one-part polyurethane compositions of the present invention can be applied in the form of a coating or film to any substrate wherein it is desired that the surface of the substrate have low friction and high abrasion resistant properties. Examples of suitable rubber substrates include natural rubber, styrene-butadiene rubbers, polybutadiene and polyisoprene rubbers, ethylene-propylene rubbers and ethylene-propylene-diene rubbers, butyl and halobutyl rubbers, nitrile rubbers, neoprene rubbers, silicone rubbers and the like. Other substrates include acrylic elastomers and flexible PVC.

The polyurethane compositions of the present invention are particularly suitable on a vehicle glass run channel as an exterior layer which contacts a moving window pane. Other uses include a coating on belt strips, on windshield wipers, on automotive door seals and on trunk lid seals. Still other uses include engine mounts, vehicle suspension bushings, refrigerator door gaskets, luggage, upholstery, golf bags and the like. The compositions of the present invention can be applied in any conventional manner such as spraying, dipping and wiping, coextrusion, in-die coating, and the like. As noted above, the composition is then heated to a cure temperature above the deblocking temperature for a time sufficient to cure the composition. Cured compositions of the present invention exhibit good compatibility with various substrates such as EPDM.

Whenever a coating is applied on a substrate such as those set forth above, i.e., a windshield wiper, glass run channel, etc., the one-part, primerless, heat curable polyurethane compositions of the present invention can be coextruded with the substrate. Coextrusion can be carried out in accordance with any conventional manner utilizing conventional coextruders and the like. In such a process, the one-part polyurethane composition generally containing the blocked polyurethane prepolymer, a curing agent, and a low friction prepolymer and/or silicone oil, is added to and extruded from one portion of the coextruder with the substrate material, for example, a polymer used for making a glass run channel, being added to and extruded from another portion of the coextruder. Both the polyurethane composition and the substrate are extruded together and subsequently heated to a temperature and time sufficient to cure the polyurethane composition.

Another advantage of the polyurethane compositions of the present invention is that they are inexpensive, especially in comparison with the polyolefin and hydrogenated polydiene type intermediates set forth in U.S. Pat. Nos. 5,115,007 and 5,221,707. Accordingly, if desired, the polyolefin or hydrogenated polydiene based polyurethane compositions as set forth in U.S. Pat. Nos. 5,115,007 and 5,221,707 can be physically blended with the low viscosity, low VOC polyurethane compositions of the present invention in amounts up to about 50 weight percent or less and desirably up to 40 weight percent or less based upon the total weight of both types of polyurethane compositions.

The one-part polyurethane compositions of the present invention will be better understood by reference to the following illustrative examples which do not serve to limit the scope of the invention.

EXAMPLES

Example 1

Preparation of Benzotriazole Blocked Urethane Prepolymer (Prepolymer A)

A 500 ml glass reactor kettle equipped with a temperature probe, a reflux condenser, and a port for the addition of ingredients was purged with nitrogen gas for 20 minutes. To the reactor, 100 g of toluene and 11.25 g (83.25 meq NCO) of methylene diphenyl diisocyanate (MDI) were added and the contents were heated to and maintained at 105° C. Two drops (~0.05 g) of DABCO T-9 catalyst (stannous octoate, Air Products Co.) were added and mixed. A total of 29.74 g (33.3 meq OH) of polyoxybutylene (BO polyol XAS 10961.00, mol. wt. 2000, Dow Chemical Company) was added to the reactor over a period of 90 minutes. The NCO/OH ratio was 2.5/1. After the addition of BO polyol was completed, the reaction was kept under refluxing conditions for 2 hours. Then 6.01 g of benzotriazole was added to block any unreacted isocyanate groups. The prepolymer was then cooled to room temperature and stored in a closed jar until used.

The total solids content of this prepolymer mixture was determined to be 28.0% by weight.

Example 2

Preparation of Methyl Ethyl Ketoxime (MEKO) Blocked Urethane Prepolymer (Prepolymer B)

The equipment and procedure used was similar to that described above except that a larger size reactor was used to accommodate the larger batch size. To the reactor, 22.5 g (166.5 meq NCO) of MDI and 303.4 g of toluene were added and the temperature of the mixture was raised to 100° C. Two drops (0.05 g) of DABCO T-9 catalyst were used. A separate solution containing 59.46 g BO polyol (XAS 10961.00, mol. wt. 2000, Dow Chemical Co.) and 50.58 g of toluene was prepared and added to the reaction vessel continuously over a period of about 3 hours and 40 minutes. The NCO/OH mole ratio was 2.5/1. The reaction was allowed to continue for about 2 more hours and a sample (11.27) was withdrawn for analysis. A total of 9.58 g of MEKO blocking agent was then added to the reactor followed by the addition of 25.0 g of toluene. After all of the reacted NCO had been used up, the reactants were cooled to room temperature and stored in a closed container.

The solids content of the prepolymer was determined gravimetrically and was found to be ~19.0T.

Example 3

Preparation of MEKO Blocked High Solids Urethane Prepolymer (Prepolymer C)

The equipment and procedure used was similar to that described above. To the reactor, 50 g (346.5 meq NCO) of liquid Isonate 2191 (modified MDI, Dow Chemical Co.) and two drops (~0.05 g) of DABCO T-9 catalyst was added and the mixture was heated to 80° C. A total of 61.88 g (69.3 meq OH) of BO polyol was then added over a period of 90 minutes. The NCO/OH mole ratio was ~5/1. To block the unreacted NCO, 24.27 g of MEKO was then added. The IR analysis of the prepolymer showed residual NCO.

Therefore, 5.0 g more of MEKO was added. Towards the end, the reactor contents began to increase in viscosity and the temperature began to increase. Some toluene was then added to reduce the viscosity and the reactants were cooled to room temperature and stored in a closed jar until used.

The solids content of this prepolymer mixture was determined gravimetrically and found to be 68.75%.

Preparation and Evaluation of Coatings

The prepolymers A through C were compounded into coatings separately (A, B, and C) and as (B+C). The coating formulations (1–4) are given in Table I. The level of curative used was based on one equivalent of curative/equivalent of NCO available for curing. The coatings were applied either by using a compressed air spray gun (coatings 1 and 2) or #12 wire-wound (Meier) rod (coatings 3 and 4). Generally, enough coating was applied to give a coating thickness in the range of 30–55 µm. After application, the coatings were cured at 200° C. for 10 minutes in an air oven.

The abrasion resistance (cycles to failure) of the coatings was determined using a modified crockmeter abrasion tester. In this test, a glass edge slides back and forth on the coated substrate at 60 cycles/minute while under a 3 kg load. The glass edge was reground at every 5000 cycles with a No. 4 sandpaper.

The thickness of the coatings was measured using an optical microscope.

Table II shows the abrasion resistance of all of the coatings described in Table I. The abrasion resistance values (cycles to failure) have been rounded out to the nearest one hundred. Since the average thickness for various coatings covered a rather broad range (33–55.4 µm), the abrasion resistance values per unit thickness (cycles/µm) were also calculated and are included in Table II (column 7) for ease of comparison.

TABLE I

COATING FORMULATIONS

| COATING NO.: REFERENCE: CONTENTS (in gm.). | 1 | 2 | 3 | 4 |
|---|---|---|---|---|
| Prepolymer A | 30.0 | — | — | — |
| Prepolymer B | — | 30.0 | — | 15.0 |
| Prepolymer C | — | — | 30.0 | 9.51 |
| TS-100 Fumed Silica[1] | 0.4 | 0.4 | 0.4 | 0.33 |
| Nylon-11[2] | 0.75 | 0.75 | 0.75 | 0.62 |
| Silicone Oil L-45[3] | 1.40 | 1.40 | 1.40 | 1.15 |
| Jeffamine T-403[4] | — | 1.24 | 6.79 | 2.54 |
| Witco Fomrez T-279[5] | 0.8136 | — | — | — |

TABLE I-continued

COATING FORMULATIONS

| COATING NO.: REFERENCE: CONTENTS (in gm.). | 1 | 2 | 3 | 4 |
|---|---|---|---|---|
| Toluene | — | 90.0 | — | — |
| VOC Level (Wt. %) | 64.8 | 92.3 | 23.8 | 51.9 |

[1]Degussa Co.
[2]Rilsan 1510/50 from Atochem.
[3]Union Carbide.
[4]Polyoxypropylene triamine (Texaco Chemical Co.). 6.1 meq. NH/g.
[5]A triol with 99% primary OH (Witco Chemical Co.). 10.97 meq. OH/g.

TABLE II

ABRASION RESISTANCE OF VARIOUS COATINGS

| COATING # | PREPOLYMER USED | PREPOLYMER WT. RATIO IN BLEND[1] | NCO/OH | AVERAGE COATING THICKNESS (µm) | ABRASION RESISTANCE (CYCLES TO FAILURE) | ABRASION RESISTANCE (CYCLES/µm) |
|---|---|---|---|---|---|---|
| 1 | A | — | 2.5 | 39.2 | 3,000 | 77 |
| 2 | B | — | 2.5 | 33.0 | 1,900[2] | 58[2] |
| 3 | C | — | 5 | 55.4 | 24,400 | 440 |
| 4 | B + C | B/C = 30.4/69.6 | 4.25[3] | 51.1 | 36,900 | 722 |

[1]Based on the solids content of the prepolymers.
[2]Coating failed due to loss of adhesion at the EPDM-coating interface.
[3]Calculated from the blend ratio of the B and C prepolymers.

As apparent from Table I and the detailed example preparations, while Coatings 1 and 2 were made from a polyoxybutylene intermediate, the NCO/OH ratio was quite low, i.e., 2.5 and thus required significant amounts of toluene to achieve a suitable viscosity. Hence they contained high VOC levels. In contrast, coating formulation 3 which had a suitable NCO/OH ratio of 5 contained a very low VOC content of approximately 24 percent by weight.

As apparent from Table II, the abrasion resistant values were significantly improved when suitable NCO/OH ratios were utilized.

Other urethane prepolymers, E though L, were prepared by varying the molecular weight of the BO polyol, NCO/OH ratios and type of isocyanate using procedures identical to those for prepolymers A, B, and C of Examples 1–3. The specifics of these prepolymers are given in Table III. These prepolymers were formulated into coatings by adding TS-100 silica, Nylon-11, silicone oil L-45 using the formulations given in Table I. Jeffamine T-403 was used as the curative. The level of curative used was based on one equivalent of curative/equivalent of NCO available for curing. The abrasion resistance results for these coatings are given in Table III.

TABLE III (Polyoxybutylene) Polyurethane Coatings:
Coating Formulations

| Pre-polymer | Isocyanate/Blocking Agent | MW Polyol/OH meq/g | NCO/OH | VOC | Composition Viscosity CPS | Abrasion Resistance (Cycles/μm) |
|---|---|---|---|---|---|---|
| E | Isonate 2191/MEKO | MW = 2000 OH = 1.12 | 4 | 17.0 | 3,000 @ 80° C. | 248 |
| F | Isonate 2191/MEKO | MW = 1000 OH = 1.996 | 6 | 40.3 | 6,100 @ 81° C. | 213 |
| G | MDI/MEKO | MW = 4800 OH = 0.428 | 4 | 44.9 | 5,840 @ 82° C. | 178 |
| H | MDI/MEKO | MW = 1000 OH = 1.996 | 4 | 46.4 | 4,000 @ 88° C. | 112 |
| I | Isonate 2191/MEKO | MW = 1000 OH = 1.996 | 4 | 41.0 | — | 147 |
| J | MDI/MEKO | MW = 1000 OH = 1.996 | 6 | 51.0 | 1,650 @ 83° C. | 157 |
| K | MDI/MEKO | MW = 2000 OH = 1.02 | 4 | 54..1 | 10,500 @ 81° C. | 87 |
| L | MDI/MEKO | MW = 4800 OH = 0.428 | 6 | 53.8 | 3,610 @ 82° C. | 172 |

As apparent from Table III, when suitable NCO/OH equivalent ratios were utilized, the VOC levels were quite low, generally below 50 percent by weight, and Example E was below 20 percent by weight. However, the viscosities of the compositions were also low and suitable abrasion resistant properties were obtained.

In accordance with another aspect of the present invention, blocked polyurethane prepolymers were made utilizing polyoxybutylene as the intermediate polyol as set forth in Example 3. The prepolymer was "J" and was formulated in a manner as set forth in Table IV which also lists the type and amount of coreactive curing agent and the type of low friction polymer utilized.

TABLE IV

| COATING | INGREDIENT | QUANTITY | ABRASION RESISTANCE CYCLES (μm) |
|---|---|---|---|
| 5 | Prepolymer J | 10.01 g | 46 |
|   | Jeffamine T-403 | 2.49 g |   |
|   | L-45 Silicone Oil (Control) | 0.51 g |   |
| 6 | Prepolymer J | 10.02 g | 2,172 |
|   | Jeffamine T-403 | 2.48 g |   |
|   | Polyfluo 523 XF* | 0.51 g |   |

*A mixture of polyethylene and polytetrafluoro ethylene manufactured by Micro Powders, Inc. of New York.

The coating compounds of Table IV, as set forth above, contained only the indicated prepolymer, the indicated blocking agent, and either silicone oil or a low friction polymer. As apparent from Table IV, the control which used silicone oil had an abrasion resistance value of only 46 cycles per micro meter. In contrast thereto, when Polyfluo 523-XF was substituted for the silicone oil, the abrasion resistance value increased over 45 times inasmuch as it was 2,172.

While in accordance with the Patent Statutes, the best mode and preferred embodiment has been set forth, the scope of the invention is not limited thereto, but rather by the scope of the attached claims.

What is claimed is:

1. A process for using a polyurethane composition as a lubricous coating on a rubber substrate comprising the steps of: applying a thin coating of polyurethane composition to one or more surfaces of a rubbery substrate, said polyurethane composition comprising a polyurethane prepolymer, a sufficient amount of a curing agent to cure said polyurethane prepolymer, and a low friction polymer or a silicone oil or combinations thereof, said polyurethane prepolymer having at least two isocyanate terminal groups and/or blocked isocyanate terminal groups being the reaction product of at least one polyisocyanate and a liquid hydroxyl terminated polyol intermediate which comprises poly(1,2-butylene oxide) wherein the ratio of equivalents of isocyanate groups to hydroxyl groups is an effective amount to produce at least two terminal isocyanate groups, and curing said polyurethane prepolymer.

2. A process according to claim 1, wherein said liquid hydroxyl terminated polyol intermediate consists essentially of poly(1,2-butylene oxide) and said ratio of equivalents is from about 2 to about 8.

3. A process according to claim 2, wherein said polyurethane composition is coextruded with said rubbery sustrate.

4. A process according to claim 2, wherein said liquid hydroxyl terminated polyol intermediate consist essentially of poly(1,2-butylene oxide).

5. A process according to claim 1, wherein said liquid hydroxyl terminated polyol intermediate has a number average molecular weight from about 400 to about 10,000 and wherein said polyurethane composition is free of the reaction product of one or more polyisocyanates with hydroxyl terminated hydrocarbon polymers of number average molecular weight of from about 500 to about 15,000 having at least 1.5 hydroxyl groups per molecule, said hydroxyl terminated hydrocarbon polymers consisting of hydrogenated diene polymers and polyolefins.

6. A process according to claim 4, wherein said liquid hydroxyl terminated intermediate has a number average molecular weight from about 400 to about 10,000 and wherein said polyurethane composition is free of the reaction product of one or more polyisocyanates with hydroxyl terminated hydrocarbon polymers of number average molecular weight of from about 500 to about 15,000 having at least 1.5 hydroxyl groups per molecule, said hydroxyl terminated hydrocarbon polymers consisting of hydrogenated diene polymers and polyolefins.

7. A process according to claim 1, wherein said rubbery substrate comprises an EPDM polymer.

8. A process according to claim 7, wherein said rubbery substrate is a glass run channel.

9. A process according to claim 3, wherein said rubbery substrate comprises an EPDM polymer.

10. A process according to claim 1, wherein said polyurethane composition has less than 40 weight percent volatile organic components.

11. A composition according to claim 2, wherein said polyurethane composition has less than 40 weight percent volatile organic components.

12. A process according to claim 3, wherein said polyurethane composition has less than 10 weight percent volatile organic components.

* * * * *